(12) United States Patent
Brandley et al.

(10) Patent No.: US 6,703,742 B1
(45) Date of Patent: Mar. 9, 2004

(54) ELECTRIC MOTOR WITH ROTOR BEING A DRIVE WHEEL

(76) Inventors: Adam K. Brandley, 1585 W. 400 North, Ogden, UT (US) 84404; John R. Irwin, 1105 W. 5575 South, Riverdale, UT (US) 84405

( * ) Notice: Subject to any disclaimer, the term of this patent is extended or adjusted under 35 U.S.C. 154(b) by 612 days.

(21) Appl. No.: 09/212,127

(22) Filed: Dec. 15, 1998

(51) Int. Cl.[7] .............................................. H02K 23/54
(52) U.S. Cl. ................ 310/156.32; 310/268; 310/68 B; 310/52; 310/64; 180/65.5; 180/65.6
(58) Field of Search .............................. 310/52, 54, 64, 310/67 R, 68 R, 156.32, 268; 180/65.5, 65.6

(56) References Cited

U.S. PATENT DOCUMENTS

| | | | | |
|---|---|---|---|---|
| 3,566,165 A | * | 2/1971 | Lohr ........................ | 310/67 R |
| 4,223,255 A | * | 9/1980 | Goldman et al. ........... | 318/138 |
| 5,127,485 A | * | 7/1992 | Wakuta et al. ............ | 310/67 R |
| 5,156,579 A | * | 10/1992 | Wakuta et al. ............. | 310/64 |
| 5,163,528 A | * | 11/1992 | Kawamoto et al. ....... | 310/67 R |
| 5,164,623 A | * | 11/1992 | Shkondin .................. | 310/67 R |
| 5,343,128 A | * | 8/1994 | Beltrame et al. ......... | 310/67 R |
| 5,355,039 A | * | 10/1994 | Couture .................... | 310/67 R |
| 5,369,324 A | * | 11/1994 | Saether .................... | 310/67 R |
| 5,442,250 A | * | 8/1995 | Stridsberg ................ | 310/67 R |
| 5,450,915 A | * | 9/1995 | Li ............................. | 310/67 R |
| 5,509,492 A | * | 4/1996 | Pfannschmidt ............ | 310/67 R |
| 5,581,136 A | * | 12/1996 | Li ............................. | 310/67 R |
| 5,633,544 A | * | 5/1997 | Toida et al. ............... | 310/67 R |
| 5,755,302 A | * | 5/1998 | Lutz et al. ................. | 180/65.2 |
| 5,788,007 A | * | 8/1998 | Miekka ..................... | 180/205 |
| 5,793,132 A | * | 8/1998 | Hirose et al. ............. | 310/67 R |
| 5,894,902 A | * | 4/1999 | Cho ........................... | 310/67 R |

* cited by examiner

*Primary Examiner*—Karl Tamai
(74) *Attorney, Agent, or Firm*—Fehr Law Firm; Thompson E. Fehr

(57) ABSTRACT

An electric motor with rotor being a drive wheel. The drive wheel has one or more permanent magnets attached to said drive wheel with opposite magnetic poles adjacent to one another. One or more electromagnets are attached to the structure to which the drive wheel is rotatably connected. A sensor determines the location of the permanent magnets. This information is utilized to assure that the electromagnets are energized only when the resultant magnetic fields will interact with the magnetic fields of the permanent magnet to produce a force on the drive wheel that will cause rotation in the desired direction. Three principal embodiments are employed. In a first embodiment, a computer periodically activates a switch to send pulsed voltage to the electromagnets; the percentage of the period of each pulse during which the voltage is non-zero determines the speed of the drive wheel. In a second embodiment, the computer is replaced with a timing circuit that controls the switch. And in a third embodiment, the output from the sensor directly controls the switch.

33 Claims, 12 Drawing Sheets

ELECTRIC MOTOR WITH ROTOR BEING A DRIVE WHEEL

BACKGROUND OF THE INVENTION

1. Field of the Invention

This invention relates to electric motors, specifically to an electric motor where the rotor of the motor also functions as a drive wheel.

2. Description of the Related Art

At least three United States patents apply to electric motors where a portion of the electric motor serves as a drive wheel, rather than providing power to a shaft which transfers such power to another component. These are U.S. Pat. No. 3,548,965 of John J. Pierro; U.S. Pat. No. 5,164,623 of Vasily V. Shkondin; and U.S. Pat. No. 5,721,473 of LeRoy M. DeVries.

U.S. Pat. No. 3,548,965 involves a rather complicated rotor primarily composed of two adjacent ferromagnetic circles, each having projections which extend toward the other circle and which projections from one circle are interdigitated with the projections from another circle. The rotor, itself, contains no magnet—either permanent or electromagnetic. A field excitation coil projects a magnetic field into both circles of the rotor. (It is stated that in some cases the field excitation coil may be replaced with one or more permanent magnets.) The magnetic field created by the field excitation coil interacts with a magnetic field created by stator conductor windings. To produce rotation of the rotor, the electric current through the stator conductor windings is supplied at a frequency which is calculated from a formula which includes the tangential velocity of the rotor. Such tangential velocity is determined by a commutator which is "preferably of electromagnetic type . . . "

The motor of U.S. Pat. No. 5,164,623 utilizes a mechanic commutator, which—being a mechanical device in which different physical parts make moving contact with one another—is subject to wear as well as physical breakage and, therefore, to malfunction. Additionally, from the drawings it appears that the electromagnets of the rotor are located radially outward from the (preferably permanent) magnets of the stator. The disclosure and claims merely state that the "magnetic members" of the stator are mounted on the circumference of the stator and face the electromagnets of the rotor.

And the rotor associated with the motor of U.S. Pat. No. 5,721,473 includes both permanent magnets and electromagnets. It is suggested on lines 62 through 64 in column 5 of U.S. Pat. No. 5,721,473 that the electromagnets of the rotor are necessary in order to achieve adequate acceleration: "When the electromagnets 16 are magnetized and incited by the wire coil stator 17, a wheel accelerates very fast." And, although the disclosure does not clearly specify the orientation of the magnets on the rotor with respect to the "wire coil stator," the drawings and the claim indicate that the magnets of the rotor are located radially outward from the "wire coil stator." In pertinent part, the claim states: "a tire and rim rotor which includes a plurality of oppositely placed interchangeable permanent and electro magnets that rotate said tire and rim rotor by means of an electric field excited by an interchangeable wire coil stator secured onto a stationary axle . . . "

In its description of the prior art, U.S. Pat. No. 5,164,623 discusses several patents issued by the former Soviet Union but states that the "independent-drive wheel[s]" of such patents have "poor controllability because of the absence of a link between dynamics of rotation and control signals."

SUMMARY OF THE INVENTION

The present Electric Motor with Rotor Being a Drive Wheel minimizes the possibility of failure by not utilizing mechanical commutators. Moreover, the current invention does not require the use of a formula to compute a frequency for the time when the electromagnets should be energized.

In the present invention, permanent magnets are placed upon one or both of the lateral sides of the drive wheel, forming the rotor. Electromagnets are attached to the structure that supports the axle for the drive wheel, creating the stator. Such electromagnets are arranged generally in a plane that is substantially parallel to, but not within, the plane or planes containing the permanent magnets and are sufficiently close to the permanent magnets that the magnetic fields of the electromagnets and the permanent magnets will interact with one another. If permanent magnets are placed upon both of the lateral sides of the drive wheel, electromagnets may be placed upon both sides of the structure that supports the axle for the drive wheel.

A sensor mounted on the structure that supports the axle for the drive wheel simply determines when a pole of a permanent magnet approaches or is near such sensor. The sensor is so located (1) that when such pole approaches or is near the sensor, magnetic attraction or repulsion between the permanent magnet and an electromagnet will produce a force in the direction that it is desired to rotate the drive wheel and (2) that when the opposite pole of the electromagnet approaches or is near the sensor, magnetic attraction or repulsion between the permanent magnet and an electromagnet would not produce a force in the direction that it is desired to rotate the drive wheel.

Three methods are employed for utilizing the information from the sensor both (1) to assure that the electromagnets will be energized only when such energization will produce a force in the desired direction and (2) to control the speed of the drive wheel.

The control of speed depends upon the fact that the speed of the drive wheel is proportional to the average power (and, therefore, the average voltage) supplied to the electromagnets. Consequently, the speed of the drive wheel is determined by regulating the average voltage that is supplied to the electromagnets.

All three methods control such average voltage by regulating the percentage of time that voltage is supplied to the electromagnets. This is accomplished by closing a switch (preferably an electronic switch—such as a transistor, a triac, or a semiconductor-controlled rectifier), i.e., substantially reducing the resistance between the terminals of the switch, in a circuit between a source of electrical energy, preferably a battery or other generator of direct current, and the electromagnets for such desired percentage of time.

To assure that force is produced only in the desired direction, the first method for closing the switch operates only between the time that the first pole of a permanent magnet approaches the sensor and the time that the second pole of the permanent magnet approaches the sensor; the second and third methods, only when a pole of polarity to which the sensor is sensitive is near such sensor. Outside of such periods, the switch is left open because no signal is sent to close such switch.

In the first method, input of the desired speed can be provided to a computer through any means that is well known in the art. The sensor is in communication with the computer and informs the computer when a pole of a permanent magnet has approached the sensor. The computer then begins producing a signal to close the switch. Preferably, the output signal from the computer will be in the form of a square wave, i.e., a periodic wave which has a constant voltage amplitude when the output is being supplied and zero amplitude during the remainder of the period. The computer communicates with the switch so that the output signal from the computer is sent to the switch and causes such switch to be closed for the proportion of the period during which the output from the computer is non-zero, i.e. when a voltage is being supplied by the computer. The computer adjusts the non-zero proportion of the period to achieve the desired average voltage being transmitted from the source of electrical energy through the switch to the electromagnets and, consequently, the desired average speed of the drive wheel. When the sensor detects that the opposite pole of the permanent magnet has approached the sensor, the sensor so informs the computer; and the computer terminates the production of an output signal, causing the switch to be open.

In a second method, the computer is replaced with a timing circuit which establishes one specific proportion of the period during which such timing circuit produces an output voltage of constant amplitude and which produces no output voltage for the remainder of the period. This proportion can only be changed by adjusting the value of an electric component, such as a potentiometer, within the timing circuit.

When the second method is employed, the sensor, which is preferably a Hall-effect switch, will produce a current or voltage that is utilized, in any manner that is well known in the art—such as by completing an electrical circuit from a source of electrical energy, to cause the timing circuit to begin and to continue operating only while a pole of a given polarity is near the sensor. Therefore, when a pole of a permanent magnet to which the sensor is sensitive is near the sensor, the sensor will initiate and maintain the operation of the timing circuit, which in turn will periodically close a switch, preferably an electronic switch, to energize the electromagnets. Such switch will remain closed only so long as it receives a voltage output from the timing circuit. When the opposite pole of the permanent magnet (or no pole) is near the sensor, the sensor will produce no current; the timing circuit will not be activated; and the switch will, consequently, not remain closed.

Alternatively, with the second method, two sensors could be located near each other. One sensor could be sensitive to one magnetic pole; the other sensor, to the other magnetic pole. (This can be accomplished by, for example, reversing the Hall-effect switch.) Then the average power and, consequently, the speed of the drive wheel would be increased.

Additionally, one sensor may be utilized to activate all the electromagnets; or there can be separate sensors for one or more electromagnets.

In a third method, the sensor acts just as in the second method. The sensor, however, communicates directly with the switch so that the voltage from the sensor is transmitted directly to the switch and acts just as does the output voltage from the timing circuit. Therefore, with the third method, no mechanism is included to alter the average voltage that is produced by the source of electrical power. The voltage produced by the source of electrical power is sent continuously to the electromagnets throughout the time that a pole of a permanent magnet to which the sensor is sensitive is near the sensor.

When the third method is used, the options with respect to sensors that were discussed for the second method are again available; and it is preferred to have a separate sensor for each electromagnet.

With all three methods the electrical signal from the sensor is either on or off (not a continuum of possible values). Therefore, with the first method, the computer can be programmed to invert the signal it sends to the switch. (Alternatively, and inverter could be placed—preferably through electronic switching operated by a user—between the sensor and the computer.) This will cause the switch controlling current to the electromagnets to be activated at the times other than those when magnetic attraction or repulsion between the permanent magnet and an electromagnet will produce a force in the original direction that it was desired to rotate the drive wheel. This will, consequently, at times produce no force and at other times produce a force that tends to cause the drive wheel to rotate in the reverse direction. If the drive wheel were already rotating in a forward direction, this would initially have a braking effect. If continued, it would ultimately result in the drive wheel rotating in the reverse direction. Of course, it would be more efficient to employ a sensor that is so located (1) that when a specific type of pole approaches or is near the sensor, magnetic attraction or repulsion between the permanent magnet and an electromagnet will produce a force to rotate the drive wheel in the reverse direction and (2) that when the opposite pole of the electromagnet approaches or is near the sensor, magnetic attraction or repulsion between the permanent magnet and an electromagnet would not produce a force to rotate the drive wheel in the reverse direction. And this more efficient technique is within the scope of the present invention.

Similarly, to obtain a force that tends to rotate the drive wheel in a reverse direction with the second method, an inverter is placed (preferably through electronic switching operated by a user) between the sensor and the timing circuit. And to accomplish this feat with the third method, an inverter is placed (preferably through electronic switching operated by a user) between the sensor and the switch.

Alternatively with any of the three methods, one or more additional switches or an H-bridge may be employed to enable current to flow through the electromagnets in a reverse direction. This would, of course, tend to cause the drive wheel to rotate in the reverse direction. If the drive wheel were already rotating in a forward direction, this would initially have a braking effect. If continued, it would ultimately result in the drive wheel rotating in the reverse direction.

In the case of the first method, the computer can send signals directing the additional switch or switches to be set so that the current would flow through the electromagnets in a forward direction or signals directing the switches to be set so that the current would flow through the electromagnets in a reverse direction. For the second and third methods, some outside force (electronic or manual) would have to activate the additional switch or switches.

The computer also has the ability to protect the motor by delaying activation of the electromagnets until the wheel has attained a desired operational speed through the application of an outside force, i.e., a force that does not result from the present invention. And the computer can be programmed to utilize the signal from the sensor to determine the speed of rotation of the drive wheel.

Furthermore, when it is desired to have more than one drive wheel operating with one another, a single computer can perform the desired computer functions for all the drive wheels.

Although the source of electrical power for the motor is preferably direct current, the motor will function with alternating current provided that the a. c. voltage is biased so that it never has a negative value. Furthermore, any method that is well known in the art can be used to control the average voltage that is supplied to the electromagnets, although the first two methods described above are preferred, with the first method being more preferred.

The ends of the core of each electromagnet are preferably bent toward the permanent magnets in order to increase the attractive and repulsive forces.

Moreover, it has been experimentally determined that the cores of the electromagnets perform more effectively when such cores are composed, ignoring the bent portion at the ends, of identical sections that are laminated with the plane of lamination being substantially parallel to the plane in which the electromagnet lies. Also, it has been experimentally determined that the electromagnets perform more effectively when they are wound with multi-strand wire.

Preferably, the structure that supports the axle for the drive wheel contains a cavity that communicates with the electromagnets and can contain either a heat-transfer medium or a heat-absorbing medium to reduce heat near the electromagnets. When a heat-transfer medium is to be employed, the cavity also communicates with at least one radiating surface, such radiating surface preferably being either composed of carbon-filled nylon plastic or a metal fin.

Optionally, the electromagnets are encapsulated within a module having at least one radiating surface, such radiating surface preferably being either metal fins or fins composed of a carbon-filled nylon plastic. The module is removably inserted into the structure that supports the axle for the drive wheel. Within a cavity of the module is placed a heat-transfer medium (a fluid or gel) which communicates with both the electromagnets and the radiating surface, thereby conducting heat from the electromagnets to the radiating surface, from which such heat is transferred to the surrounding environment.

Moreover, in a still further alternative, the electromagnets can either simply be air cooled or may have liquid circulated between such electromagnets and a radiating heat sink through tubes or passages. When the tubes are utilized, a unique magnetic pump is employed that is operated by a magnetic connection between the rotating permanent magnets and a permanent magnet located in the impeller of the pump. And air cooling may be aided by the attachment of a fan to the structure that supports the axle for the drive wheel.

The simultaneous alignment of more than one electromagnet with more than one permanent magnet, which is termed "cogging," increases drag. Any technique which will prevent such cogging, such as having the spacing between electromagnets different from that between permanent magnets or having the distance between poles of electromagnets different from that between poles of adjacent permanent magnets, is, therefore preferred.

Also, to prevent energy losses caused by coupling between electromagnets, pairs of electromagnets are preferably activated alternately by the computer in the first method; by placing a flip-flop between the output of the timing circuit and the electromagnets in the second method; and, if a single sensor, is utilized for all electromagnets, placing a flip-flop between the sensor and the electromagnets in the third method.

DESCRIPTION OF THE PREFERRED EMBODIMENT

In the present invention, the drive wheel 1 (a wheel which powers the device to which such wheel is attached) actually constitutes the rotating portion of an electric motor, i.e., the rotor.

Figure 1:
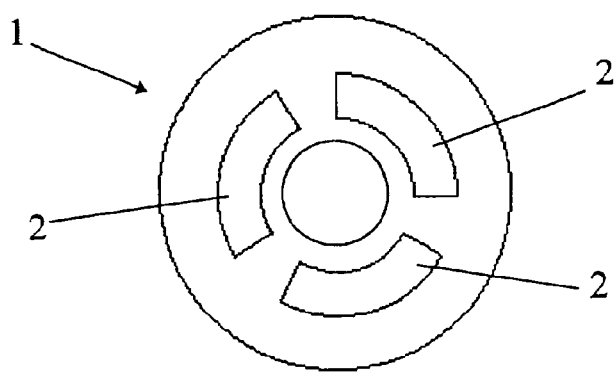
FIG. 1 depicts the drive wheel and rotor of the Electric Motor with Rotor Being a Drive Wheel.
Figure 2:
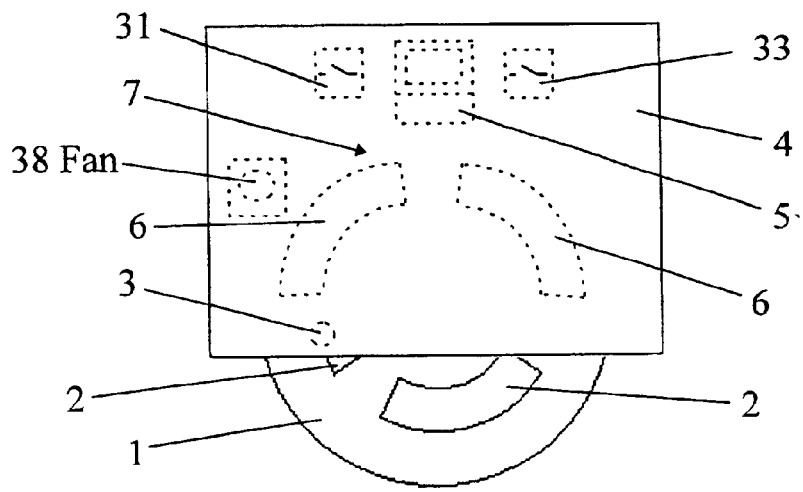
FIG. 2 shows an air-cooled version of the Electric Motor with Rotor Being a Drive Wheel where a computer is employed to control the speed of the drive wheels.
Figure 3:
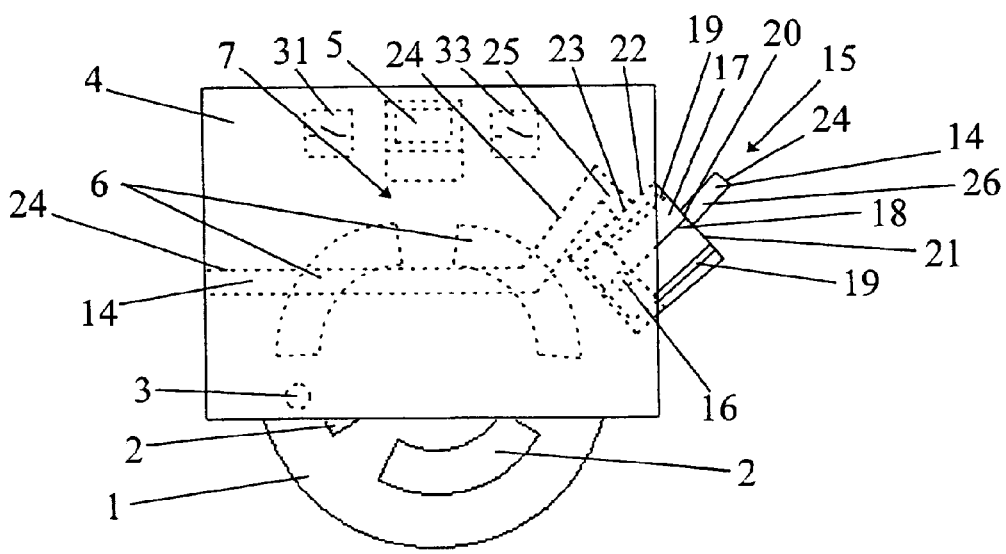
FIG. 3 illustrates a liquid-cooled version of the Electric Motor with Rotor Being a Drive Wheel where a computer is employed to control the speed of the drive wheels.

As illustrated in FIG. 1, on at least one lateral side of the drive wheel 1, the wheel 1 contains one or more (preferably, six) permanent magnets 2, which are preferably arranged in a circle, with opposite magnetic poles adjacent to one another. The permanent magnets 2 are preferably releasably attached to the drive wheel 1.

As viewed from the side, each permanent magnet 2 preferably has a shape which is defined by the area that is the difference between the sector of one circle and the sector of a second concentric circle having a smaller radius than the first circle.

Figure 18:
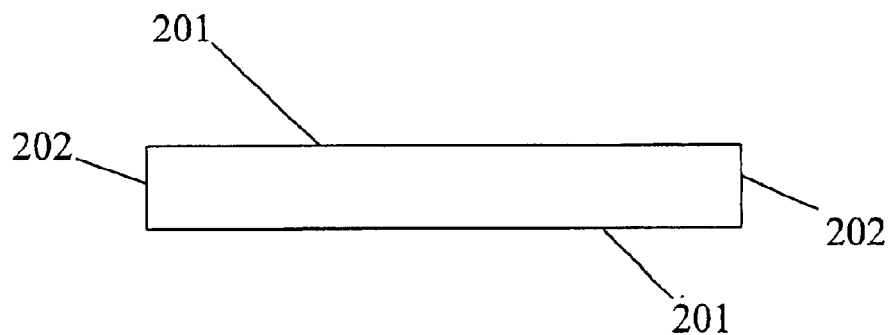
FIG. 18 displays a side view of a permanent magnet.
Figure 19:
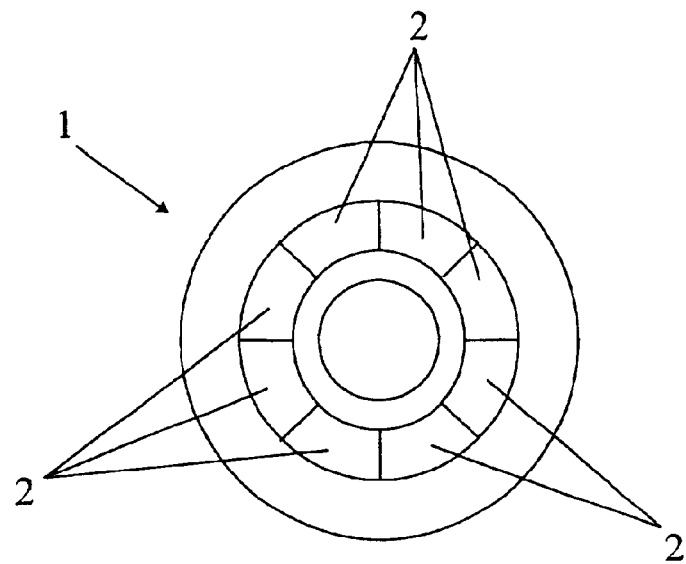
FIG. 19 illustrates the drive wheel where the sides of adjacent permanent magnets touch each other.
Figure 20:
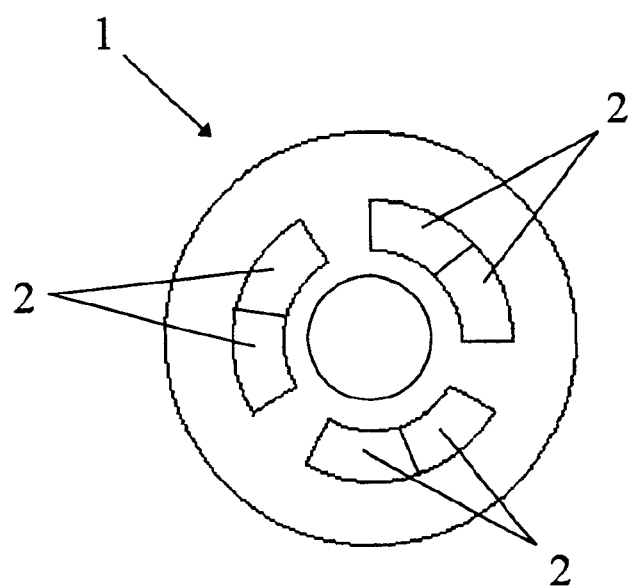
FIG. 20 shows the drive wheel where only one side of each permanent magnet touches a side of another permanent magnet.
Figure 21:
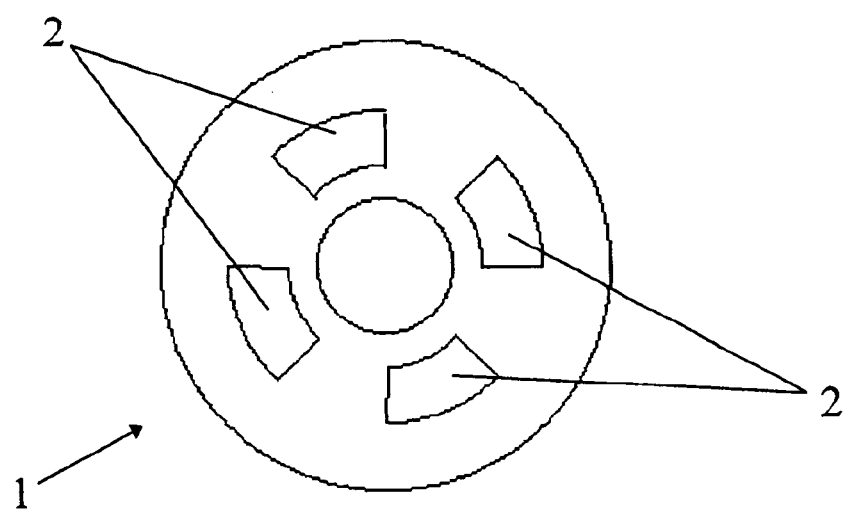
FIG. 21 portrays an embodiment of the drive wheel in which no side of any permanent magnet touches the side of any other permanent magnet.

The poles, however, are preferably at the ends 201, as illustrated in FIG. 18, of each permanent magnet 2 so that viewing the drive wheel 1 from the side allows one to see only the pole of a given permanent magnet 2. Thus, for poles to alternate as described above, a given pole of one permanent magnet 2 faces the viewer and the opposite pole of the next permanent magnet 2 faces the viewer. The sides 202 of adjacent permanent magnets 2 may, as shown in FIG. 19, touch each other. Alternatively, as depicted in FIG. 20, only one side 202 of each permanent magnet 2 may touch a side 202 of another permanent magnet 2. And in a still further embodiment, which is pictured in FIG. 21, no side 202 of any permanent magnet 2 touches the side 202 of any other permanent magnet 2.

The permanent magnets 2 (or, in the case of the alternative where only one side 202 of each permanent magnet 2 may touch a side 202 of another permanent magnet 2, pairs of permanent magnets 2) are preferably, but not necessarily, arranged symnmetrically.

A sensor 3 (preferably located in the structure 4 to which the axle of the drive wheel 1 is attached)—shown in FIG. 2, FIG. 3, FIG. 5, and FIG. 6 (for the first method for controlling the direction and speed of the drive wheel 1); in FIG. 9, FIG. 10, FIG. 11, and FIG. 12 (for the second method for controlling the direction and speed of the drive wheel 1); and in FIG. 13, FIG. 14, FIG. 15, and FIG. 16 (for the third method for controlling the direction and speed of the drive wheel 1)—determines, as described above, the location of the permanent magnets 2.

One or, preferably, more electromagnets 6 are attached to the structure 4 that supports the axle for the drive wheel 1, creating the stator 7. Such electromagnets 6 are arranged generally in a plane that is substantially parallel to, but not within, the plane or planes containing the permanent magnets 2 and are sufficiently close to the permanent magnets 2 that the magnetic fields of the electromagnets 6 and the permanent magnets 2 will interact with one another. If permanent magnets 2 are placed upon both of the lateral sides of the drive wheel 1, electromagnets 6 may be placed upon both sides of the structure 4 that supports the axle for the drive wheel 1.

The speed of rotation for the drive wheel 1 is, as discussed above, determined by the average voltage which is provided to the electromagnets 6. This, as well as assuring that the drive wheel 1 rotates in the desired direction, is preferably accomplished through one of the three methods described above. The first method employs the computer 5 (generally in the form of an integrated circuit chip) and a switch 31, preferably an electronic switch 31. The second method utilizes a timing circuit 50 of any nature that is well known in the art and the switch 31. And the third method merely uses the switch 31.

To cause the drive wheel 1 to tend to rotate in a reverse direction when the first method is utilized, the computer 5 can be programmed to invert the output signal that it sends to the switch 31. (Alternatively, an inverter 33 can be placed—preferably through electronic switching directed by the computer 5—between the sensor 3 and the computer 5.) To accomplish this same goal when the timing circuit 50 is employed, the inverter 33 is placed (preferably by electronic switching operated by a user) between the sensor 3 and the timing circuit 50. And to achieve a similar result with the third method, the inverter 33 is placed (preferably by electronic switching operated by a user) between the sensor 3 and the switch 31.

Alternatively with all three methods, one or more additional switches or an H-bridge 33 may be employed to enable current to flow through the electromagnets 6 in a reverse direction. This would, of course, tend to cause the drive wheel 1 to rotate in the reverse direction. If the drive wheel 1 were already rotating in a forward direction, this would initially have a braking effect. If continued, it would ultimately result in the drive wheel 1 rotating in the reverse direction.

Figure 5:
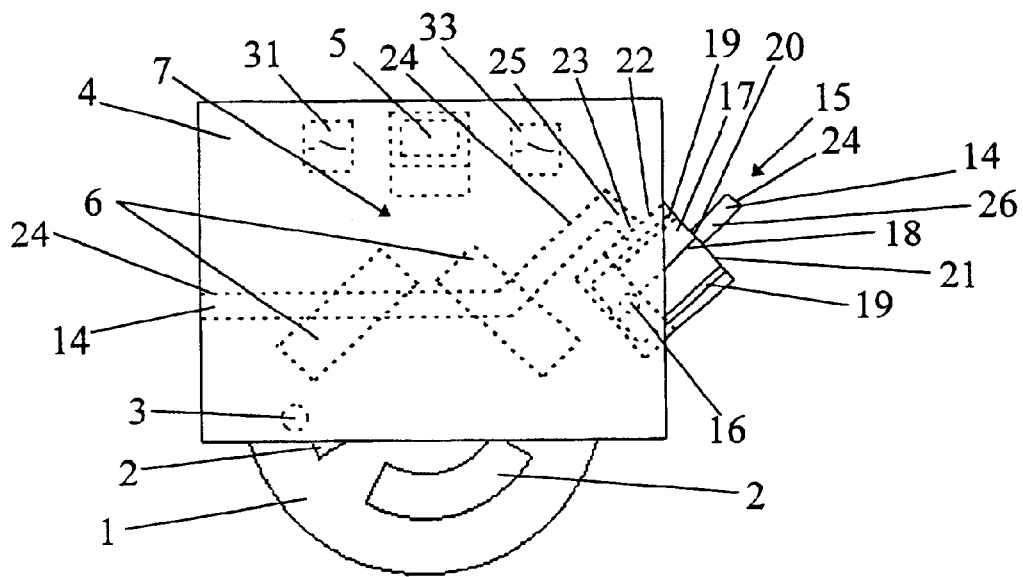
FIG. 5 is a view of the same embodiment as that of FIG. 3 except that the electromagnets are straight, rather than curved.
Figure 6:
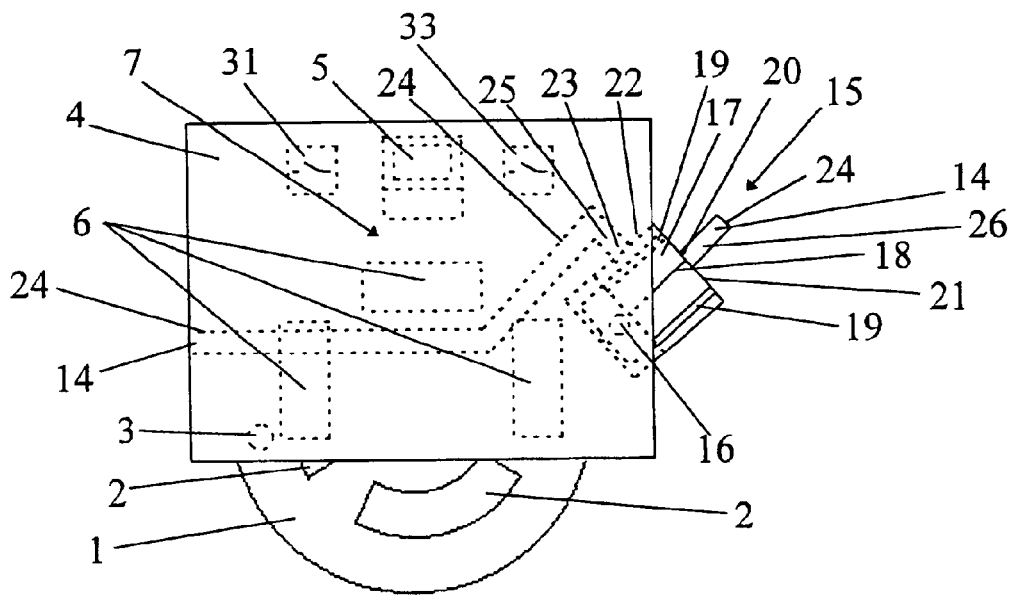
FIG. 6 differs from the embodiment of FIG. 5 only in that three electromagnets, rather than two, have been utilized.
Figure 11:
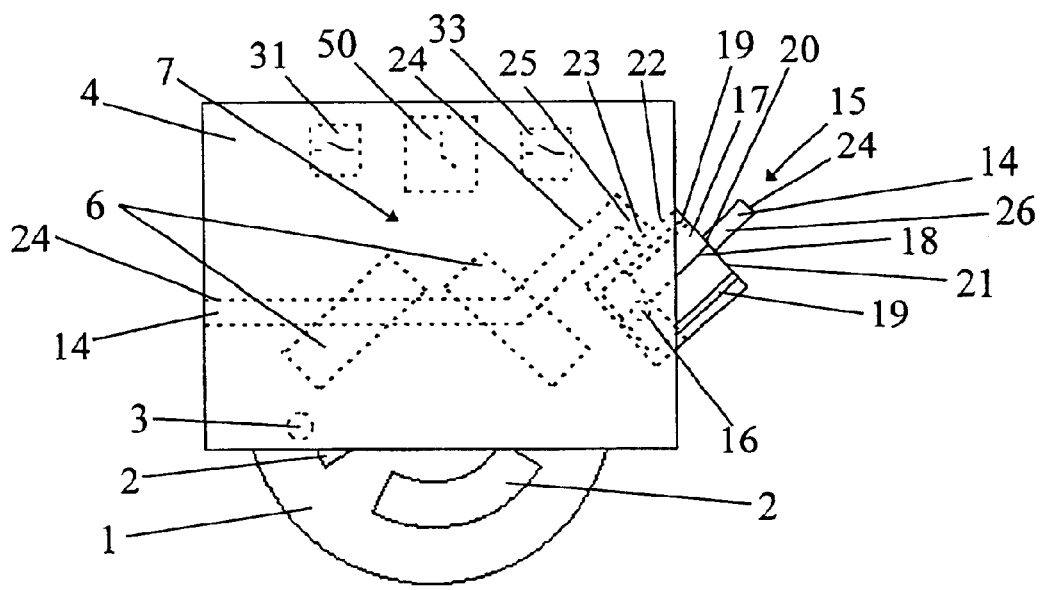
FIG. 11 is a view of the same embodiment as that of FIG. 10 except that the electromagnets are straight, rather than curved.
Figure 12:
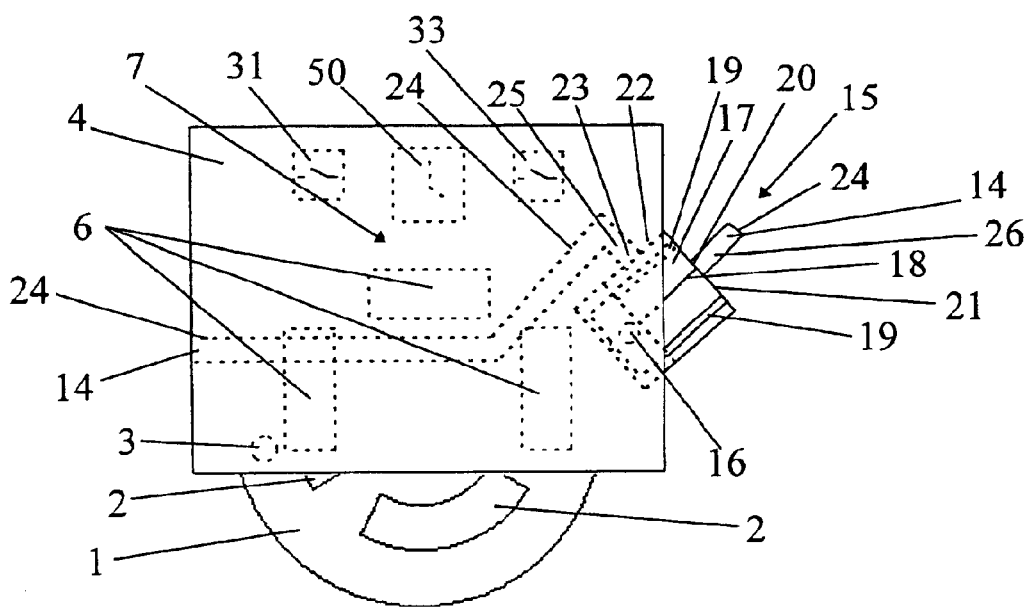
FIG. 12 differs from the embodiment of FIG. 11 only in that three electromagnets, rather than two, have been utilized.
Figure 13:
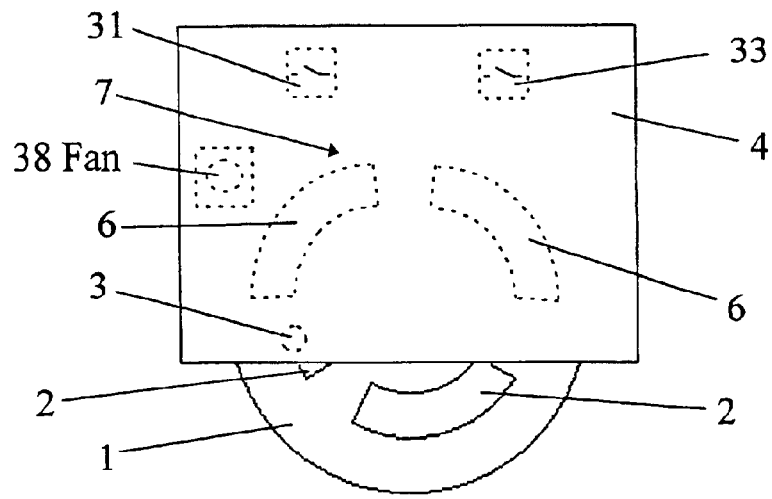
FIG. 13 shows an air-cooled version of the Electric Motor with Rotor Being a Drive Wheel when only a switch or switches are utilized to connect the source of electrical energy to the electromagnets.
Figure 14:
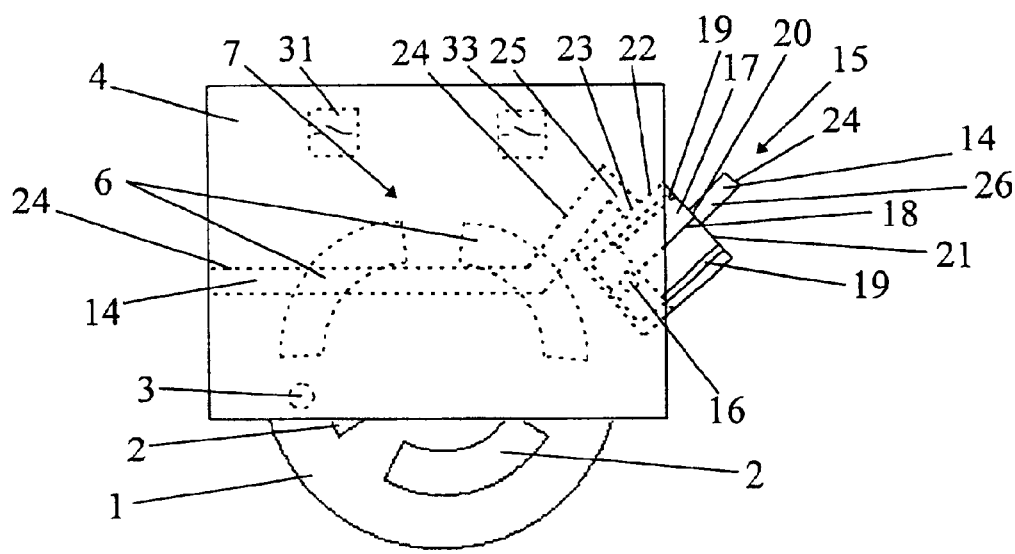
FIG. 14 illustrates a liquid-cooled version of the Electric Motor with Rotor Being a Drive Wheel when only a switch or switches are utilized to connect the source of electrical energy to the electromagnets.
Figure 15:
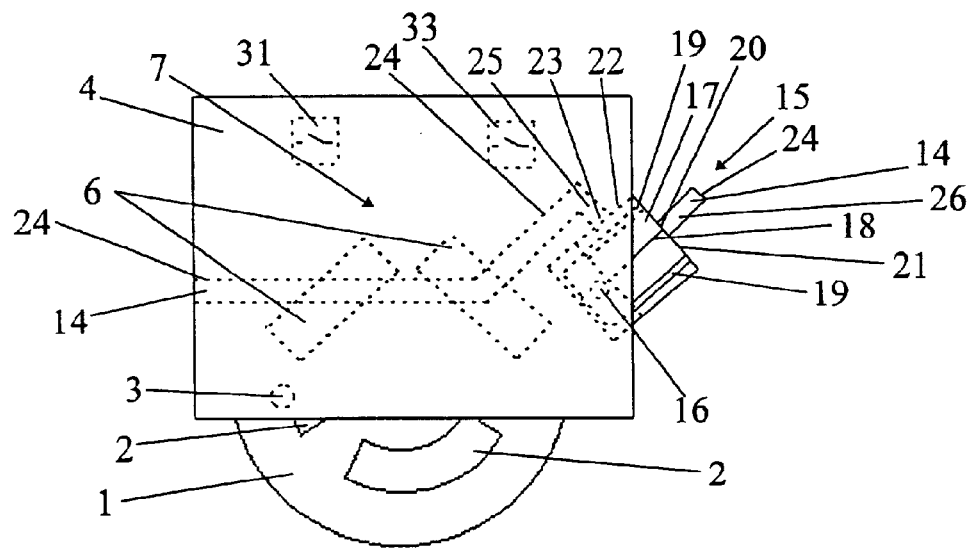
FIG. 15 is a view of the same embodiment as that of FIG. 14 except that the electromagnets are straight, rather than curved.
Figure 16:
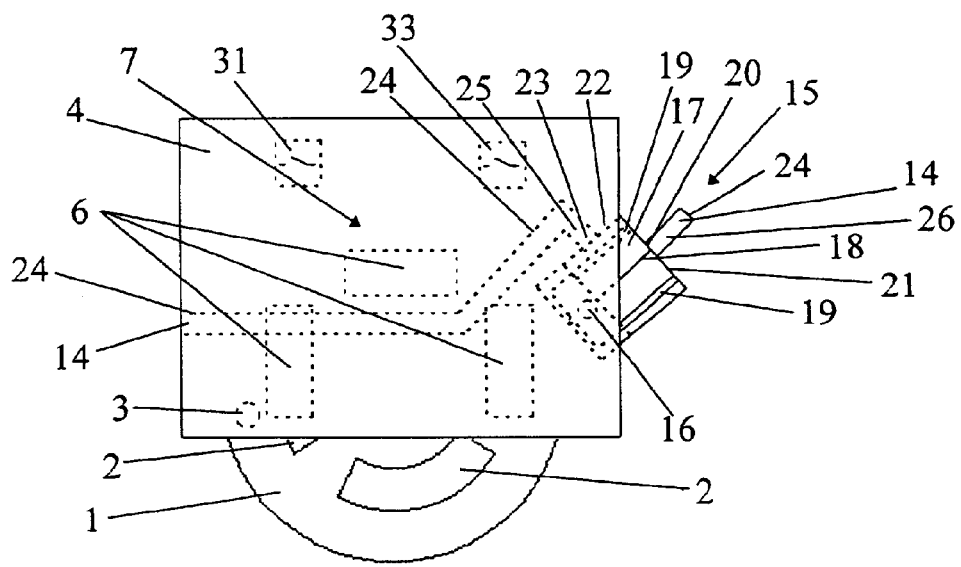
FIG. 16 differs from the embodiment of FIG. 15 only in that three electromagnets, rather than two, have been utilized.

The electromagnets 6, as viewed from the side, preferably are rectangular in shape, as illustrated in FIG. 5, FIG. 6, FIG. 11, FIG. 12, FIG. 15, and FIG. 16, although the electromagnets 6 may have other shapes, including a shape similar to that of the permanent magnets 2, as illustrated in FIG. 2, FIG. 3, FIG. 9, FIG. 10, FIG. 13, and FIG. 14. Also there are preferably two electromagnets 6, and the two electromagnets are preferably arranged in and inverted "V," as depicted in FIG. 5, FIG. 11, and FIG. 15. Optionally, however, three electromagnets 6 can be arranged with one electromagnet 6 placed horizontally and an electromagnet 6 placed vertically below each end of the horizontal electromagnet 6 as shown in FIG. 6, FIG. 12, and FIG. 16.

Figure 4:
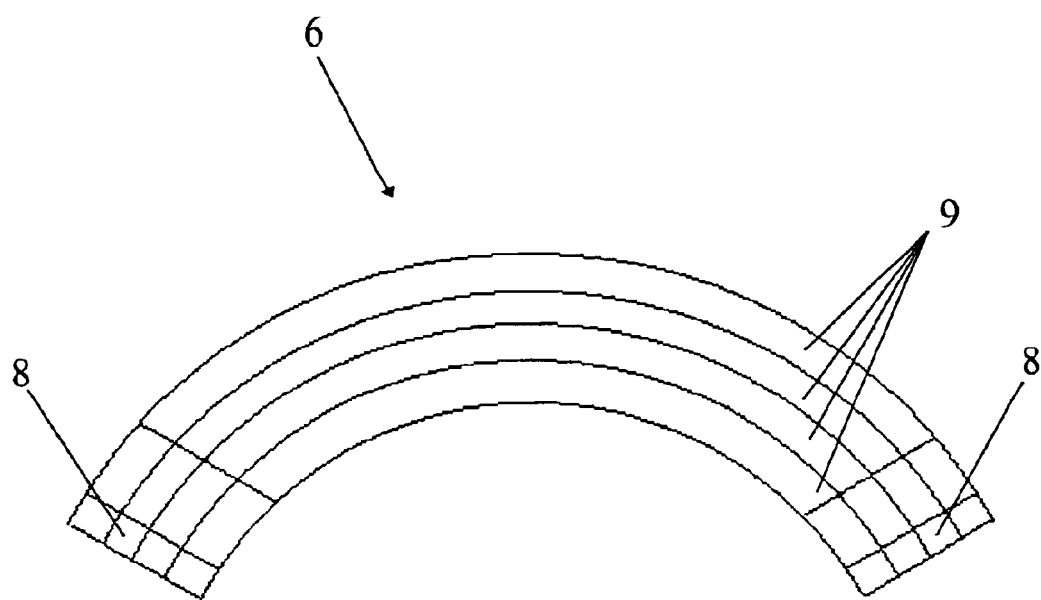
FIG. 4 portrays the core of a curved electromagnetic, demonstrating the bent ends of the electromagnet.

As illustrated in FIG. 4, the ends 8 of the core of each electromagnet 6 are preferably bent toward the permanent magnets 2 in order to increase the attractive and repulsive forces.

Moreover, it has been experimentally determined that the cores of the electromagnets 6 perform more effectively when such cores are composed, ignoring the bent portion at the ends 8, of identical sections 9 that are laminated with the plane of lamination being substantially parallel to the plane in which the electromagnet 6 lies. Also, it has been experimentally determined that the electromagnets 6 perform more effectively when they are wound with multi-strand cable.

Figure 17:
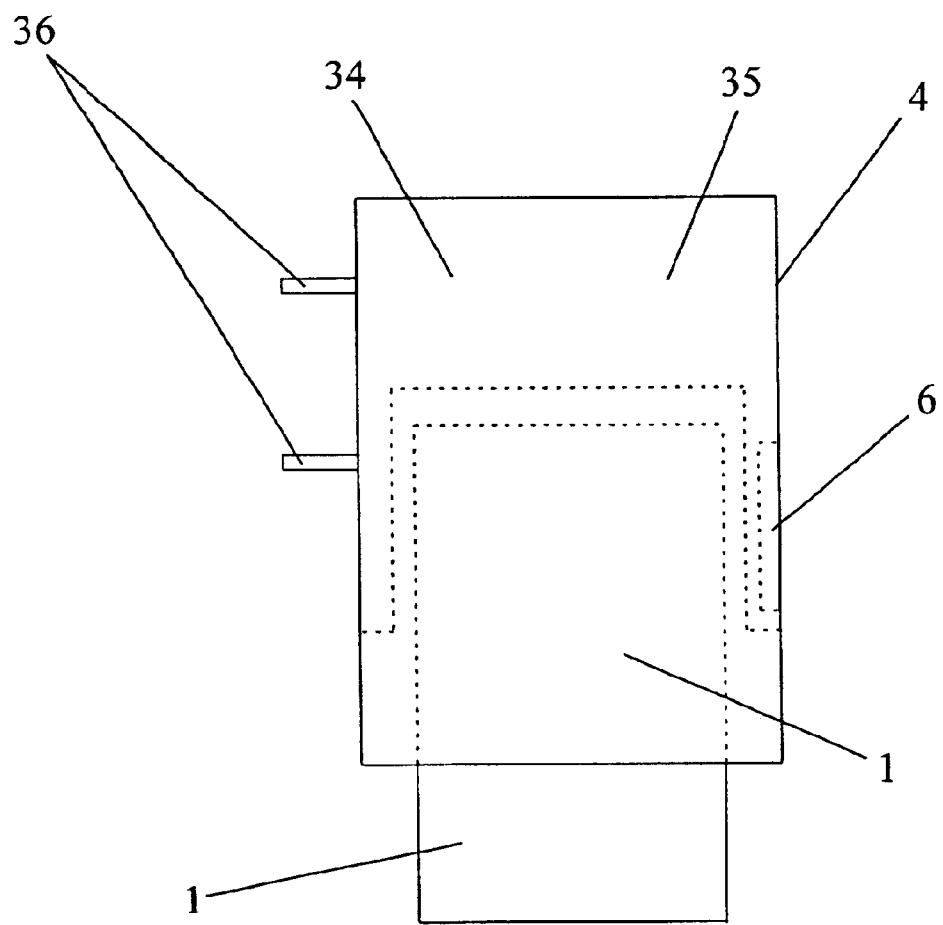
FIG. 17 shows the embodiment incorporating the cavity in the structure to which the axle of the drive wheel is attached.

Preferably, as discussed above and as depicted in FIG. 17, the structure 4 that supports the axle for the drive wheel 1 contains a cavity 34 that communicates with the electromagnets 6 and can contain either a heat-transfer medium 35 or a heat-absorbing 35 medium to reduce heat near the electromagnets 6. When a heat-transfer medium 35 is to be employed, the cavity 34 also communicates with at least one radiating surface 36, such radiating surface 36 preferably either being composed of carbon-filled nylon plastic or comprising a fin made of metal. Examples of heat-transfer media 35 are antifreeze and heat sink compound. Examples of heat-transfer media 35 or heat-absorbing media 35 are wax; plastic-encapsulated wax spheres such as those sold under the trade name THERMASORB® by Frisby Technologies, Inc. of Winston-Salem, N.C.; and such plastic-encapsulated wax spheres mixed into mineral oil. Of these examples, it has been experimentally determined that heat sink compound performs most satisfactorily.

Figure 7:
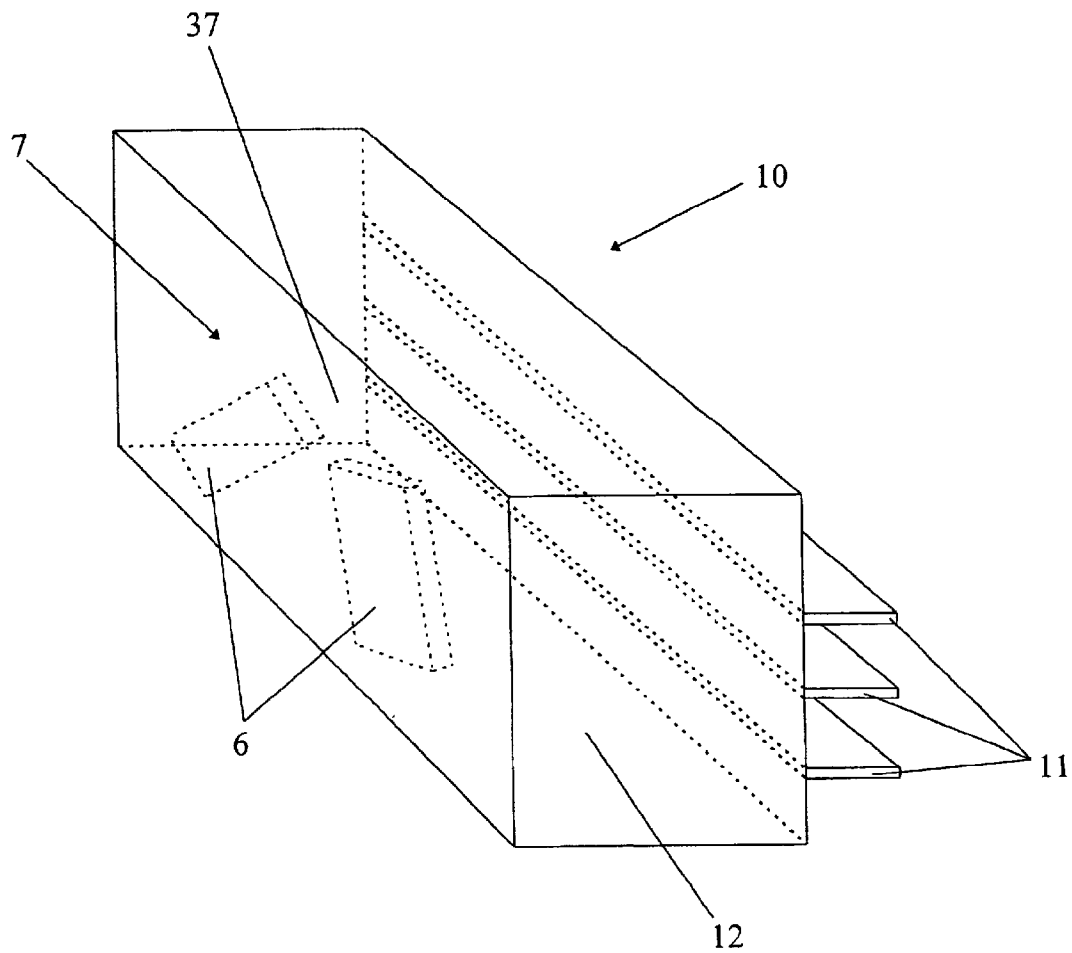
FIG. 7 shows a module within which the electromagnets are preferably located.

Optionally and again as considered above, as shown in FIG. 7, the electromagnets 6 are encapsulated within a module 10 having a radiating surface, preferably metal (or carbon-filled nylon plastic) fins, 11. The module 10 is removably inserted into the structure 4 that supports the axle for the drive wheel 1. Within a cavity 37 of the module 10 is placed a heat-transfer medium 12 (a gel or fluid 12) which communicates with both the electromagnets 6 and the radiating surface 11, thereby conducting heat from the electromagnets 6 to the radiating surface 11, from which such heat is transferred to the surrounding environment.

Figure 8:
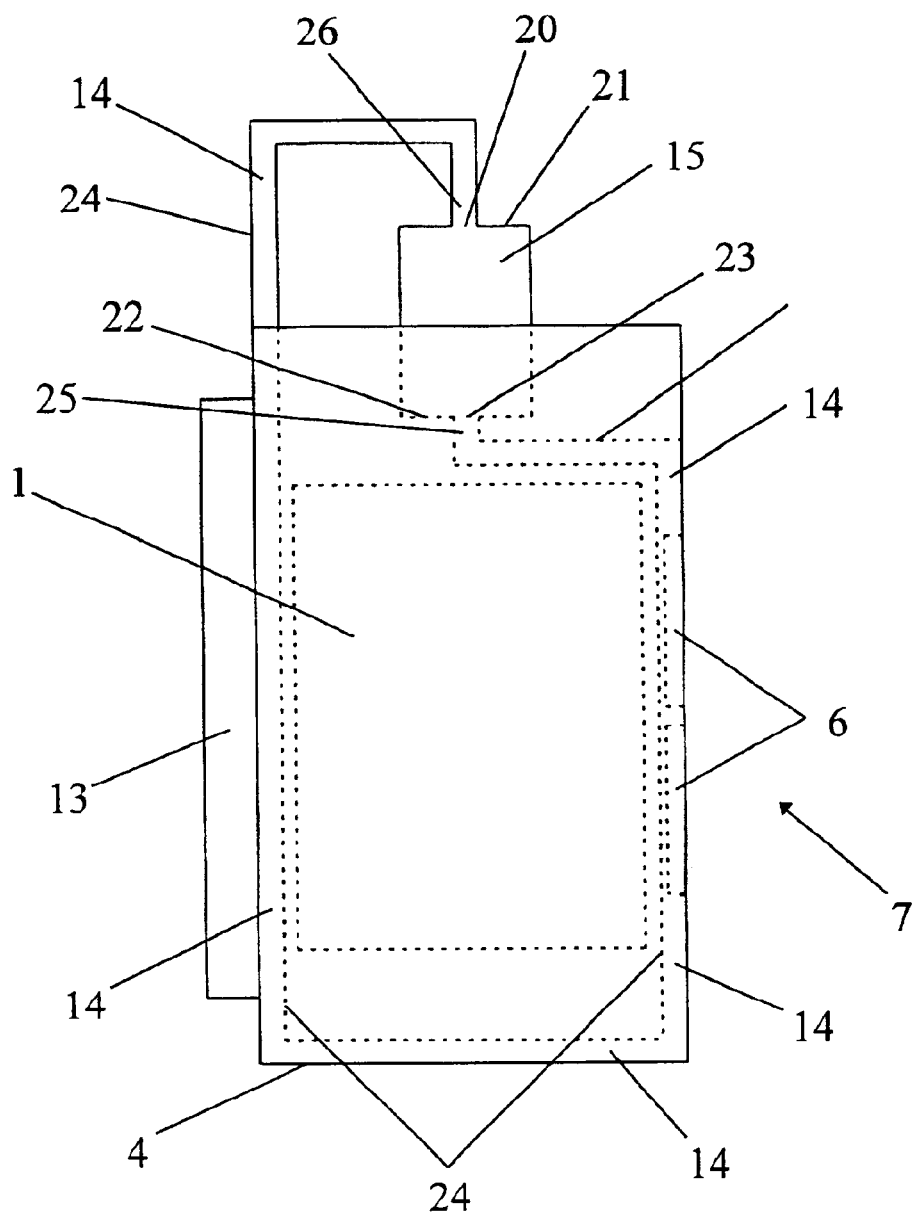
FIG. 8 is a view from above the embodiment of FIG. 5.
Figure 9:
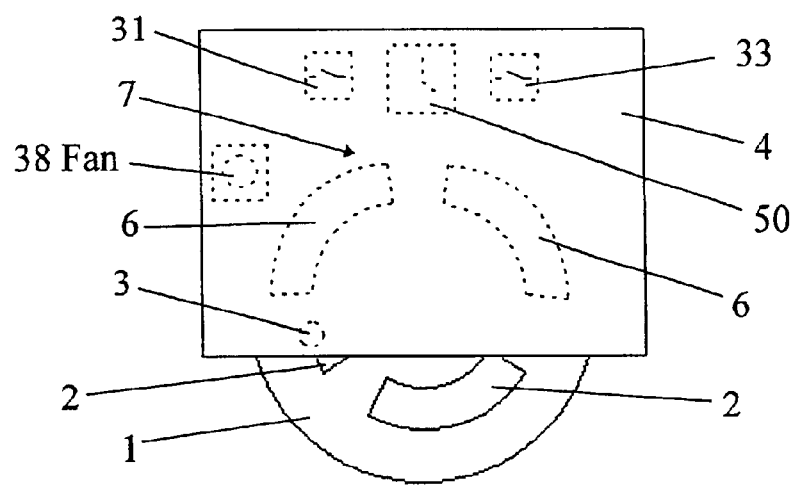
FIG. 9 shows an air-cooled version of the Electric Motor with Rotor Being a Drive Wheel using a timing circuit to control the speed of the drive wheel.
Figure 10:
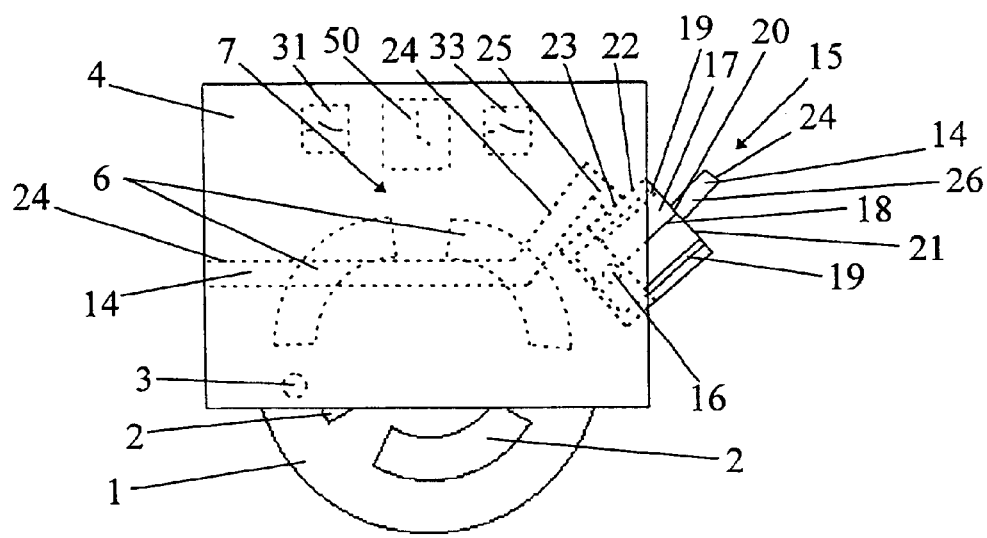
FIG. 10 illustrates a liquid-cooled version of the Electric Motor with Rotor Being a Drive Wheel using a timing circuit to control the speed of the drive wheel.

Moreover, in a still further alternative, the electromagnets 6 can either simply be air cooled or may have liquid circulated between such electromagnets 6 and a radiating heat sink 13, as illustrated in FIG. 8. Such liquid may, for example, be antifreeze or water.

If the electromagnets 6 are liquid cooled, the liquid cooling fluid 14 is—as shown in FIG. 3, FIG. 5, FIG. 8, FIG. 10, FIG. 11, FIG. 14, and FIG. 15—preferably pumped by means of a magnetic pump 15 which is turned by the interaction between the permanent magnets 2 of the drive wheel 1 and a permanent magnet 16 located in the impeller 17 of the pump 15.

The impeller magnet 16 is preferably cylindrical and is preferably installed perpendicularly to the axis of rotation 18 for the impeller 17 and so as to have the longitudinal axis of the impeller magnet 16 bisect the angle between any two adjacent vanes 19 of the impeller 17. (Preferably, the impeller 17 has four vanes 19.)

The impeller 17 is located within the magnetic field created by the closest permanent magnet 2 to the impeller 17. Therefore, as the permanent magnets 2 rotate with the drive wheel 1, magnetic attraction and repulsion cause the impeller magnet 16 to rotate, thereby rotating the impeller 17. Cooling fluid 14 flows into the impeller 17 from an aperture 20 on a first side 21 of the impeller 17 and is pushed by the rotating vanes 19 to a second side 22 of the impeller 17 where such cooling fluid 14 exits from the impeller 17 through an aperture 23. The cooling fluid 14 is thereby forced through a tube or passage 24 past the electromagnets 6 and along the radiating heat sink 13 before being returned to the magnetic pump 15. A first end 25 of the tube or passage 24 is connected to aperture 23 of the pump 15, and a second end 26 of the tube or passage 24 is attached to aperture 20 of the magnetic pump 15.

When air cooling is employed, such cooling may be aided by the attachment, through any method that is well known in the art, of a fan 38 to the structure 4 that supports the axle for the drive wheel 1 in order to force more air past the electromagnets 6.

Preferably, to prevent energy losses caused by coupling between electromagnets 6, pairs of electromagnets 6 are activated alternately by the computer in the first method; by placing a flip-flop 401 between the output of the timing circuit 50 and the electromagnets 6 in the second method; and, if a single sensor 3, is utilized for all electromagnets 6, placing a flip-flop 401 between the sensor 3 and the electromagnets 6 in the third method.

We claim:

1. An electric motor, which comprises:
   a drive wheel;
   a structure to which said drive wheel is rotatably attached;
   one or more permanent magnets attached to said drive wheel with opposite magnetic poles adjacent to one another;
   one or more electromagnets attached to said structure and arranged generally in a place that is substantially parallel to, but not within, the plane or planes containing said permanent magnets, said electromagnets being sufficiently close to said permanent magnets that the magnetic fields of said electromagnets and said permanent magnets will interact with one another;
   a sensor that determines the location of said permanent magnets;
   a switch for activating said electromagnets by connecting said electromagnets to a source of electrical power; and
   a computer, said computer being capable of receiving input of the desired speed of rotation for said drive wheel, said computer being in communication with said sensor so that said computer is informed by said sensor about the location of said permanent magnets, said computer also being in communication with said switch in order to close said switch, said computer being capable of being programmed to produce a signal to close said switch periodically from the time a pole of one of said permanent magnets has approached said sensor until the opposite pole of said permanent magnet approaches said sensor, and said computer producing such a periodic signal to close said switch that the total period said switch is closed will create an average voltage that produces the desired speed of rotation for said drive wheel.

2. The electric motor as recited in claim 1, wherein:
   said computer has been further programmed to have the capability to invert the signal it sends to said switch.

3. The electric motor as recited in claim 2, further comprising:
   a magnetic pump containing a magnet, which magnetic pump is operated by interaction between said permanent magnets and the magnet in said magnetic pump;
   a radiating heat sink; and
   a passage for transporting a cooling fluid from said magnetic pump, past said electromagnets, to said radiating heat sink, and back to said magnetic pump.

4. The electric motor as recited in claim 2, further comprising:
   a module encapsulating one or more of said electromagnets, having a radiating surface, and containing a cavity that communicates with both said electromagnets and the radiating surface so that a heal-transfer medium can be placed into such cavity, said module being removably insertable into said structure.

5. The electric motor as recited in claim 2, wherein:
   said structure contains a cavity that communicates with said electromagnets and can contain either a heat-transfer medium or a heat-absorbing medium.

6. The electric motor as recited in claim 5, further comprising:
   at least one radiating surface, said radiating surface communicating with said cavity.

7. The electric motor as recited in claim 1, further comprising:
   a module encapsulating one or more of said electromagnets, having a radiating surface, and containing a cavity that communicates with both said electromagnets and the radiating surface so that a heat-transfer medium can be placed into such cavity, said module being removably insertable into said structure.

8. The electric motor as recited in claim 1, wherein:
   said structure contains a cavity that communicates with said electromagnets and can contain either a heat-transfer medium or a heat-absorbing medium.

9. The electric motor as recited in claim 8, further comprising:
   at least one radiating surface, said radiating surface communicating with said cavity.

10. The electric motor as recited in claim 1, further comprising:
   a magnetic pump containing a magnet, which magnetic pump is operated by interaction between said permanent magnets and the magnet in said magnetic pump;
   a radiating heat sink; and
   a passage for transporting a cooling fluid from said magnetic pump, past said electromagnets, to said radiating heat sink, and back to said magnetic pump.

11. An electric motor, which comprises:
   a drive wheel;
   a structure to which said drive wheel is rotatably attached;
   one or more permanent magnets attached to said drive wheel with opposite magnetic poles adjacent to one another;
   one or more electromagnets attached to said structure and arranged generally in a plane that is substantially parallel to, but not within, the plane or planes containing said permanent magnets, said electromagnets being sufficiently close to said permanent magnets that the magnetic fields of said electromagnets and said permanent magnets will interact with one another;
   a sensor that produces a current only so long as a pole, having a given polarity, of one of said permanent magnets is near said sensor;
   a switch for activating said electromagnets by connecting said electromagnets to a source of electrical power; and
   a timing circuit, said timing circuit being in communication with said sensor, said timing circuit also being in communication with said switch in order to close said switch, said timing circuit producing a periodic signal to close said switch only while said sensor produces a current, and said timing circuit producing a periodic signal to close such switch wherein the total period said switch is closed is fixed by the value of an electronic component within said timing circuit.

12. The electric motor as recited in claim 11, further comprising:
   an inverter, said inverter being electronically inserted by a user between said sensor and said timing circuit, for causing an inversion of any electronic signal that is sent from said sensor to said timing circuit.

13. The electric motor as recited in claim 12, further comprising:
   a magnetic pump containing a magnet, which magnetic pump is operated by interaction between said permanent magnets and the magnet in said magnetic pump;
   a radiating heat sink; and
   a passage for transporting a cooling fluid from said magnetic pump, past said electromagnets, to said radiating heat sink, and back to said magnetic pump.

14. The electric motor as recited in claim 12, further comprising:
   a module encapsulating one or more of said electromagnets, having a radiating surface, and containing a cavity that communicates with both said electromagnets and the radiating surface so that a heat-transfer medium can be placed into such cavity, said module being removably insertable into said structure.

15. The electric motor as recited in claim 12, wherein:
   said structure contains a cavity that communicates with said electromagnets and can contain either a heat-transfer medium or a heat-absorbing medium.

16. The electric motor as recited in claim 15, further comprising:
   at least one radiating surface, said radiating surface communicating with said cavity.

17. The electric motor as recited in claim 11, further comprising:
   a module encapsulating one or more of said electromagnets, having a radiating surface, and containing a cavity that communicates with both said electromagnets and the radiating surface so that a heat-transfer medium can be placed into such cavity, said module being removably insertable into said structure.

18. The electric motor as recited in claim 11, wherein:
   said structure contains a cavity that communicates with said electromagnets and can contain either a heat-transfer medium or a heat-absorbing medium.

19. The electric motor as recited in claim 17 wherein:
   at least one radiating surface, said radiating surface communicating with said cavity.

20. The electric motor as recited in claim 11, further comprising:
   a magnetic pump containing a magnet, which magnetic pump is operated by interaction between said permanent magnets and the magnet in said magnetic pump;
   a radiating heat sink; and
   a passage for transporting a cooling fluid from said magnetic pump, past said electromagnets, to said radiating heat sink, and back to said magnetic pump.

21. An electric motor, which comprises:
   a drive wheel;
   a structure to which said drive wheel is rotatably attached;
   one or more permanent magnets attached to said drive wheel with opposite magnetic poles adjacent to one another;
   one or more electromagnets attached to said structure and arranged generally in a plane that is substantially parallel to, but not within, the plane or planes containing said permanent magnets, said electromagnets being sufficiently close to said permanent magnets that the magnetic fields of said electromagnets and said permanent magnets will interact with one another;
   a sensor that produces a voltage only so long as a pole, having a given polarity, of one of said permanent magnets is near said sensor; and
   a switch for activating said electromagnets by connecting said electromagnets to a source of electrical power, said switch being in communication with said sensor and said switch being closed when and only when said switch receives voltage from said sensor.

22. The electric motor as recited in claim 21, further comprising:
   an inverter, said inverter being electronically inserted by a user between said sensor and said switch, for causing an inversion of any electronic signal that is sent from said sensor to said switch.

23. The electric motor as recited in claim 22, further comprising:
   a magnetic pump containing a magnet, which magnetic pump is operated by interaction between said permanent magnets and the magnet in said magnetic pump;
   a radiating heat sink; and
   a passage for transporting a cooling fluid from said magnetic pump, past said electromagnets, to said radiating heat sink, and back to said magnetic pump.

24. The electric motor as recited in claim 22, further comprising:
a module encapsulating one or more of said electromagnets, having a radiating surface, and containing a cavity that communicates with both said electromagnets and the radiating surface so that a heat-transfer medium can he placed into such cavity, said module being removably insertable into said structure.

25. The electric motor as recited in claim 22, wherein:
said structure contains a cavity that communicates with said electromagnets and can contain either a heat-transfer medium or a heat-absorbing medium.

26. The electric motor as recited in claim 25, further comprising:
at least one radiating surface, said radiating surface communicating with said cavity.

27. The electric motor as recited in claim 21, further comprising:
a module encapsulating one or more of said electromagnets, having a radiating surface, and containing a cavity that communicates with both said electromagnets and the radiating surface so that a heat-transfer medium can be placed into such cavity, said module being removably insertable into said structure.

28. The electric motor as recited in claim 21, wherein:
said structure contains a cavity that communicates with said electromagnets and can contain either a heat-transfer medium or a heat-absorbing medium.

29. The electric motor at recited in claim 28, further comprising:
at least one radiating surface, said radiating surface communicating with said cavity.

30. The electric motor as recited in claim 21, further comprising:
a magnetic pump containing a magnet, which magnetic pump is operated by interaction between said permanent magnets and the magnet in said magnetic pump;
a radiating heat sink; and
a passage for transporting a cooling fluid from said magnetic pump, past said electromagnets, to said radiating heat sink, and back to said magnetic pump.

31. A process for electrically powering a drive wheel, which comprises:
rotatably attaching a drive wheel to a structure;
attaching to said drive wheel one or more permanent magnets with opposite magnetic poles adjacent to one another;
attaching to said structure one or more electromagnets arranged generally in a plane that is substantially parallel to, but not within, the plane or planes containing said permanent magnets, said electromagnets being sufficiently close to said permanent magnets that the magnetic fields of said electromagnets and said permanent magnets will interact with one another;
determining the location of said permanent magnets with a sensor;
connecting a switch for activating said electromagnets between said electromagnets and a source of electrical power;
inputting to a computer the desired speed of rotation for said drive wheel;
having said sensor inform said computer about the location of said permanent magnets;
connecting said computer to said switch;
programming said computer to produce a signal to close said switch periodically from the time a pole of one of said permanent magnets has approached said sensor until the opposite pole of said permanent magnet approaches said sensor; and
producing with said computer such a periodic signal to close said switch so that the total period said switch is closed will create an average voltage that produces the desired speed of rotation for said drive wheel.

32. A process for electrically powering a drive wheel, which comprises:
rotatably attaching a drive wheel to a structure;
attaching to said drive wheel one or more permanent magnets with opposite magnetic poles adjacent to one another;
attaching to said structure one or more electromagnets arranged generally in a plane that is substantially parallel to, but not within, the plane or planes containing said permanent magnets, said electromagnets being sufficiently close to said permanent magnets that the magnetic fields of said electromagnets and said permanent magnets will interact with one another;
producing a current with as sensor that creates such current only so long as a pole, having a given polarity, of one of said permanent magnets is near said sensor;
connecting a switch for activating said electromagnets between said electromagnets and a source of electrical power;
connecting said sensor to said timing circuit;
connecting said timing circuit to said switch; and
producing with said timing circuit a periodic signal to close said switch only while said sensor produces a current, wherein the total period for which said periodic signal closes said switch is fixed by the value of an electronic component within said timing circuit.

33. A process for electrically powering a drive wheel, which comprises:
rotatably attaching a drive wheel to a structure;
attaching to said drive wheel one or more permanent magnets with opposite magnetic poles adjacent to one another;
attaching to said structure one or more electromagnets arranged generally in a plane that is substantially parallel to, but not within, the plane or planes containing said permanent magnets, said electromagnets being sufficiently close to said permanent magnets that the magnetic fields of said electromagnets and said permanent magnets will interact with one another;
producing a voltage with as sensor that creates such voltage only so long as a pole, having a given polarity, of one of said permanent magnets is near said sensor;
connecting a switch between said electromagnets and a source of electrical power; and
connecting said sensor to said switch so that said switch closes when and only when said switch receives voltage from said sensor.

\* \* \* \* \*